(12) United States Patent
MeenakshiSundaram et al.

(10) Patent No.: US 12,093,637 B2
(45) Date of Patent: Sep. 17, 2024

(54) COMPLIANCE FABRIC FOR ENTERPRISE UI/UX STANDARDS

(71) Applicant: Bank of America Corporation, Charlotte, NC (US)

(72) Inventors: Meenakshi MeenakshiSundaram, Chennai (IN); Nithya C, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 26 days.

(21) Appl. No.: 18/103,642

(22) Filed: Jan. 31, 2023

(65) Prior Publication Data

US 2024/0256758 A1    Aug. 1, 2024

(51) Int. Cl.
  *G06F 40/14*    (2020.01)
  *G06F 9/451*    (2018.01)
  *G06F 40/154*    (2020.01)
  *G06V 10/82*    (2022.01)
  *G06V 30/42*    (2022.01)

(52) U.S. Cl.
  CPC ............ *G06F 40/14* (2020.01); *G06F 40/154* (2020.01); *G06V 10/82* (2022.01); *G06V 30/42* (2022.01); *G06F 9/451* (2018.02)

(58) Field of Classification Search
  CPC ........ G06F 40/14; G06F 40/154; G06F 9/451; G06V 30/42; G06V 10/82
  USPC ........................................ 715/236
  See application file for complete search history.

(56) References Cited

U.S. PATENT DOCUMENTS

| | | | |
|---|---|---|---|
| 9,459,846 B2 | 10/2016 | Bornheimer et al. | |
| 9,841,956 B2 | 12/2017 | Bornheimer et al. | |
| 9,983,775 B2* | 5/2018 | Jain | G06F 9/451 |
| 10,902,254 B2* | 1/2021 | Lodhia | G06T 7/70 |
| 11,507,638 B2* | 11/2022 | Mori | G06F 16/9577 |
| 2012/0198364 A1* | 8/2012 | Bornheimer | G06F 8/38 |
| | | | 715/762 |
| 2012/0198365 A1 | 8/2012 | Bornheimer et al. | |
| 2012/0198367 A1 | 8/2012 | Bornheimer et al. | |
| 2020/0081691 A1* | 3/2020 | Gupta | G06N 3/082 |
| 2021/0035568 A1 | 2/2021 | Miller et al. | |
| 2021/0150263 A1* | 5/2021 | Corwin | G06F 16/148 |

* cited by examiner

*Primary Examiner* — Tan H Tran
*Assistant Examiner* — Nicholas Hasty
(74) *Attorney, Agent, or Firm* — Banner & Witcoff, Ltd.

(57) ABSTRACT

Deep learning in the form of a deepfakes fabricator can be utilized to analyzed proposed documents, images, webpages etc. in order to ensure compliance with UI/UX standards. A rover component can scan and compartmentalize detected objects. A deepfakes fabricator can identify source datasets corresponding to detected objects and transform the objects so that they comply with standards stored in a web integrant. Resulting objects may be combined into an integrated image and an operational synthetic webpage may be created. Similarly, the disclosed deep-learning and other processes may operate in reverse and utilize an approved document, image, website, etc. in order automatically create (in whole or in part) a set of UI/UX standards.

1 Claim, 10 Drawing Sheets

FIG. 4A - Optional Detection of HTML or Metadata to Enhance Deep Learning

400

```
Styles   Computed   Layout   Event Listeners   DOM Breakpoints   Properties   »

Filter                                                     :hov  .cls  +  ⌀  ▣ element.style {
}
body {                                                          style.css.br:1
    overflow: ▸ hidden;
}                                        Style Sheet Data - 402 body {                                                          style.css.br:1
    background-color: ☐#fff;
    font-family: var(--lucid-theme-font-family,'Graphik LC Web',sans-serif);
    font-size: 13px;
    margin: ▸ 0;
    padding: ▸ 0;   Font Type, Color, Size, Margin, Padding Info - 404
}

* {                                                             style.css.br:1
    user-select: none;
}                                        Style Sheet Data - 402

*, .btn, .component-btn.disabled, .component-btn.disabled-with-    style.css.br:1
pointer, .component-btn[disabled], .dialog .dialog-body .button,
.dialog-footer .buttons .button, .dock-panel-tab {
    -webkit-user-select: none;
    -ms-user-select: none;
    -moz-user-select: none;
} body {                                                      user agent stylesheet
    display: block;
    margin: ▸ 8px;
}
```

FIG. 4B - Optional Detection of HTML or Metadata to Enhance Deep Learning

From FIG. 4A

Pseudo ::scrollbar element

```
:not(.default-scrollbar)::-webkit-scrollbar {
    height: 14px;
    width: 14px;
    overflow: visible;
}
```
Scrollbar Data - 406

Style Sheet Data - 402 style.css.br:1

Pseudo ::scrollbar-button element

```
:not(.default-scrollbar)::-webkit-scrollbar-button {
    height: 0;
    width: 0;
}
```
Scrollbar Button Data - 408

Style Sheet Data - 402 style.css.br:1

Pseudo ::scrollbar-corner element

```
:not(.default-scrollbar)::-webkit-scrollbar-corner {
    background: rgba(255,255,255,.9);
    -webkit-box-shadow: inset 0 0 6px rgb(0 0 0 / 10%);
}
```
Scrollbar Corner Data - 410 style.css.br:1

Pseudo ::scrollbar-thumb element

```
:not(.default-scrollbar)::-webkit-scrollbar-thumb {
    background-clip: padding-box;
    border: 3px solid transparent;
    border-radius: 7px;
    min-height: 28px;
    padding: 100px 0 0;
    -webkit-box-shadow: inset 0 0 7px rgb(0 0 0 / 25%);
}
```
Scrollbar Thumb Element Data - 412 style.css.br:1

Pseudo ::scrollbar-track element

```
:not(.default-scrollbar)::-webkit-scrollbar-track {
    background-clip: padding-box;
    background: rgba(255,255,255,.9);
    -webkit-box-shadow: inset 0 0 6px rgb(0 0 0 / 10%);
}
```
Style Sheet Data - 402 style.css.br:1

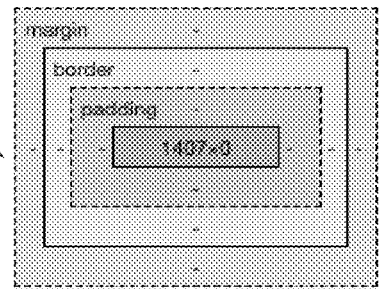

414

COMPLIANCE FABRIC FOR ENTERPRISE UI/UX STANDARDS

TECHNICAL FIELD

The present disclosure relates to data processing with respect to operator interfaces and, more particularly, to processes, machines, and manufactures for interface conversions in the context of creating UI/UX compliant websites by scanning source images for objects, compartmentalizing the objects, extracting and interpreting objects and background data, utilizing deep learning on the objects and background data, retrieving standardized UI/UX parameters from web integrant datasets corresponding to the objects and background data, applying the UI/UX standardized parameters, and generating an operational synthetic website from the foregoing in order to provide a compliant fabric for UI/UX standards.

DESCRIPTION OF THE RELATED ART

In order to build a brand image, many organizations have style guide(s) that define User Interface (UI) and User Experience (UX) standards at product and/or at enterprise levels.

User interface style guides are an all-encompassing collection of design standards as well as terms and conditions for the construction of user interface elements and interactions that take place in a variety of web and app products. This ensures that the final product is consistent across a variety of design teams, companies, and brands. They are essential for product teams and designers to have in order to maintain the same, visual, design style consistently.

The majority of the time, they take the form of a set of guidelines or visual references that are intended to assist designers in defining or establishing the typography, user interface elements, and interactions in the same way, always.

Before beginning to build a web or app product, the majority of design teams or companies first create a user interface style guide. UI style guides provide various advantages. Marketing and sales are boosted as a result of the consistent branding. It makes it easier for designers and developers to communicate with one another and work together. It helps create a unified user interface and experience across all of your products. Any new members of the team, clients, or stakeholders will find learning much simpler as a result. Throughout the course of the product's lifecycle, it is simple to be brought up to date based on the latest design standards and trends.

The user interface style guide is a useful tool for both design and development that can assist designers and developers in working together on the same visual language. Therefore, a good user interface style guide should include many different things, such as: essential UI components, such as alerts, brand logos, boxes (such as check boxes), buttons (such as radio buttons), color palettes (such as primary, secondary, and tertiary color palettes), compartmentalization, fonts (such as size, style, and color), footers, headers, icons, item/element (such as functionality, interactivity, locations, etc.), layouts and sizes, loaders, pagination components, sliders, and tools. They may also contain design instructions, such as those that are necessary to explain the basic guidelines, file formats that are involved, the tone and voice of the design, and other details that are explained clearly, such as instructions for spacing and positioning, design notes, and more.

A style guide helps to maintain the consistency and recognizability of a brand's identity. Having a style guide that defines the guidelines for maintaining a brand's identity will make the work of designers, writers, and developers much easier and will serve as a starting point for quality work. Since a style guide defines the guidelines for maintaining a brand's identity, having this document as a reference for expected standards will make this work much easier.

The testing and verification of the application is the standard procedure for determining whether or not a product or an enterprise complies with UI standards. This is determined by referring to the style guide. Even when a company is in the middle of the process of redesigning its brand, a significant investment of time and resources is allotted in order to make the necessary adjustments.

However, preparation of a UI/UX style guide is a very laborious and resource-intensive task that requires significant coordination, substantial development time, and a tremendous investment of resources in order to comprehend the most recent user interface standards and develop web pages that are based on the same. These problems are compounded as changes or updates are made to the current UI/UX guide.

As a result, there is a long-felt and unsatisfied need to overcome the difficulties described above that are associated with the prior art in order to enable the optimized creation of standardized and consistent user interfaces and user experiences.

SUMMARY OF THE INVENTION

In accordance with one or more arrangements of the non-limiting sample disclosures contained herein, solutions are provided to address one or more of the shortcomings in the field of operator interfaces by, inter alia: (a) creating synthetic websites based on deep learning (e.g., deepfakes); (b) providing unique input to deep learning based on objection detections; (c) utilizing an object detector of a rover component to crawl over images and detect placeholders, sections, and object types; (d) identifying small components of the screen through compartmentalization by object detections within sections; (e) using a deepfake fabricator to read and consume objects provided by rover compartmentalization based on parameters such as placeholders, sections, and object types; (f) accessing web integrant folders or data structures to identify the appropriate UI/UX standards for the objects; (g) cropping, shearing, or otherwise modifying UI/UX standardized objects to fit into the proposed webpage; (h) combining all standardized objects and forms into an integrated web image; and (i) utilizing a webpage convertor to generate an operational web site. Thus, deep learning can be constructively for building web pages complying with UI/UX enterprise standards by no-code or less-code leveraging of deepfake applications and tools for webpage development that otherwise would be code intensive from a process point of view. Building on this functionality, it may be used as well to implement a deep-learning process that can automatically generate UI/UX standards based on a document, image, PSD, or website that has been approved as a sample or standard.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a standardized compliance process for user interface and user experience (UI/UX) standards on a computing machine can comprise one or more steps such as: converting, by a rover component, an input into an image; scanning, by the rover component, the image to detect scanned objects in the image; compartmentalizing, by a compartmentalization component, the scanned objects into compartmentalized data; transmitting, by the compartmentalization component to a deepfakes fabricator, the compartmentalized data; deep learning, by the deepfakes fabricator on the compartmentalized data, to identify source datasets corresponding to the compartmentalized data; retrieving, by the deepfakes fabricator from a web integrant, UI/UX standardized datasets corresponding to the source datasets; transforming, by the deepfakes fabricator based on the UI/UX standardized datasets and the compartmentalization data, the scanned objects into final objects; integrating, by the deepfakes fabricator, the scanned objects into integrated data; and generating, by the deepfakes fabricator, a synthetic webpage from the integrated data.

In some arrangements, a standardized compliance process for user interface and user experience (UI/UX) standards on a computing machine can comprise one or more steps such as: retrieving, by a rover module, a source webpage; converting, by the rover module, the source webpage into a source image; crawling over the image, by an object detector in the rover module, to detect initial objects in the source image; detecting, by the rover module, placeholders and object types for the initial objects in the source image; compartmentalizing, by compartmentalizer in the rover module, (X,Y) screen coordinates components for the initial objects; analyzing, by a deepfakes fabricator, the initial objects, placeholders, object types, and (X,Y) screen coordinates; retrieving, by the deepfakes fabricator from a web integrant, datasets corresponding to the initial objects; transforming, by the deepfakes fabricator, the initial objects into transformed objects based on the datasets in order to fit the transformed objects on a synthetic webpage; forming, by the deepfakes fabricator, the transformed objects into an integrated web image; and converting, by the deepfakes fabricator, the integrated web image into the synthetic webpage.

In some arrangements, an input or source webpage may be an HTML file, an image, or an Adobe Photoshop Document (PSD).

In some arrangements, compartmentalized data or image data may include placeholders, sections, and object types for classification and placement purposes. Object detection may detect objects within sections to provide small components through a compartmentalization process.

In some arrangements, a web integrant may be a database, datastore, or the like that includes various datasets including, but not limited to, logo datasets, header datasets, footer datasets, and/or other datasets relevant to UI/UX standards.

In some arrangements, cropping and/or shearing may be performed on objects so that they fit appropriately on the final synthetic page.

In some arrangements, integrated objects or data can be formed into an integrated web image for processing.

In some arrangements, an integrated web image may be converted into an HTML file or similar webpage format or source code.

In some arrangements, an integrated web image may be converted into a cascading style sheet (CSS).

In some arrangements, a deep-learning process to automatically generate user interface and user experience (UI/UX) standards on a computing machine can comprise one or more steps such as: receiving, by a deepfakes fabricator, a source to be used as a basis for the UI/UX standards; detecting, by the deepfakes fabricator, objects in the source; retrieving, by the deepfakes fabricator from the objects in the source, object types and location information for the objects; generating, by the deepfakes fabricator, datasets for the objects based on the object types and location information; and creating, by the deepfakes fabricator, a ui/ux style guide based on the datasets.

In some arrangements, one or more deep-learning processes may use one or more deep-learning algorithms such as: Convolutional Neural Networks (CNNs), Long Short Term Memory Networks (LSTMs), Recurrent Neural Networks (RNNs), Generative Adversarial Networks (GANs), Radial Basis Function Networks (RBFNs), Multilayer Perceptrons (MLPs), Self Organizing Maps (SOMs), Deep Belief Networks (DBNs), Restricted Boltzmann Machines (RBMs), and/or Autoencoders.

In some arrangements, one or more various steps of processes disclosed herein can be implemented in whole or in part as computer-executable instructions stored on computer-readable media. Functionality and steps can be performed on a machine or distributed across a plurality of machines that are in communication with one another. And skilled artisans will appreciate that the various steps or processes may be performed in differing orders and are not limited to any disclosed linear progressions discussed herein for sample arrangement explanations. Similarly, parallel processing as opposed to linear progressions may be utilized as well if desired.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIGS. 4A and 4B illustrate samples of HTML or metadata that can be associated with a webpage or image that optionally can be used to augment deep-learning detection and classification of objects in accordance with one or more compliance fabric aspects of this disclosure.

DETAILED DESCRIPTION

Figure 1A:
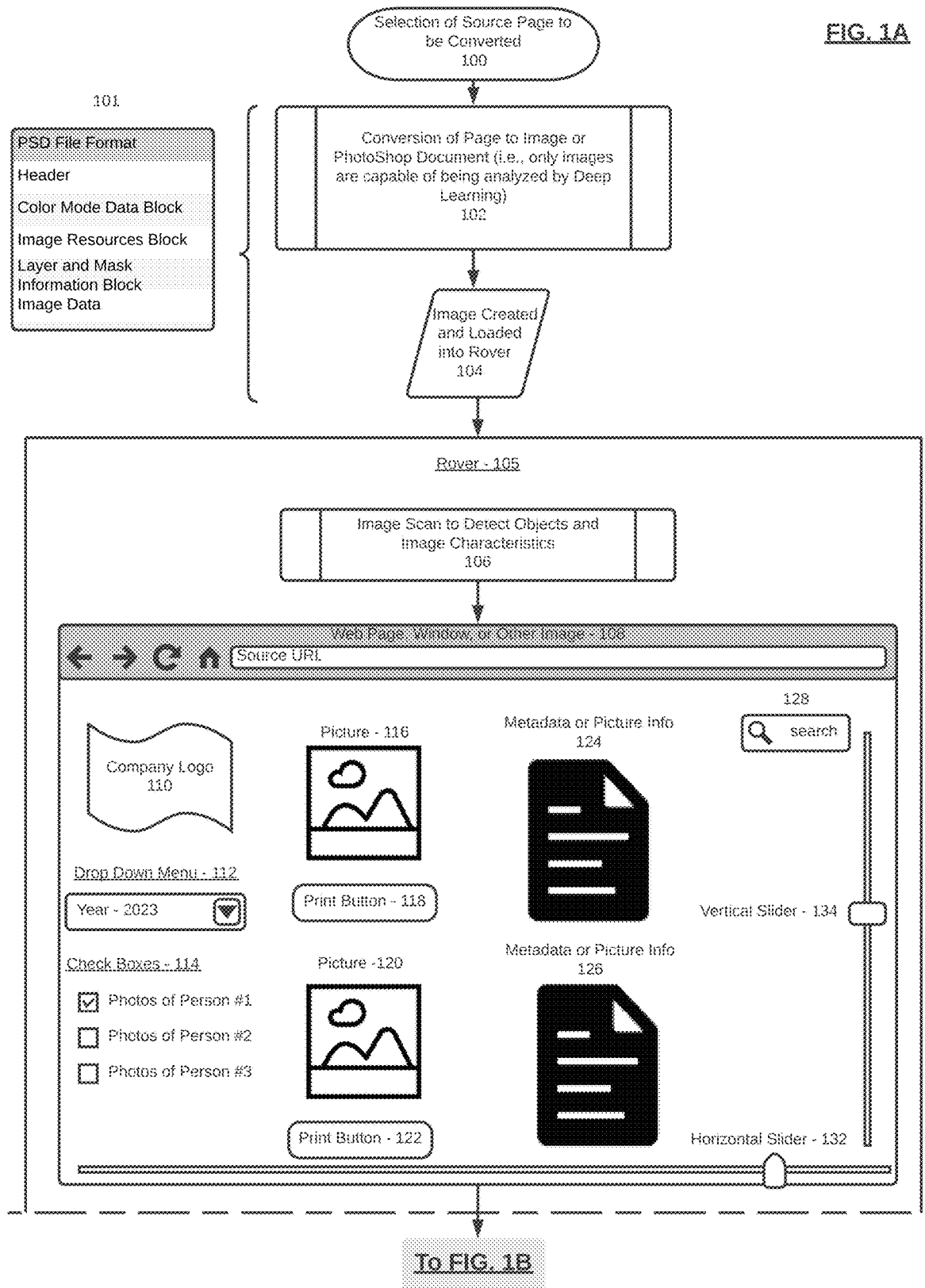
FIGS. 1A and 1B depict sample structural diagrams in accordance with one or more deep-learning UI/UX standardization aspects of this disclosure in the context of creating UI/UX compliant websites by interface conversions based on an initial process of detection of objects and data.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compartmentalizers, compliance watchers, computing devices, computing platforms, controlled computers, controlling computers, deepfake fabricators, deep learning machines (including neural network architectures, autoencoders, generative adversarial networks), desktop computers, distributed systems, enterprise computers, instances, laptop devices, monitors or monitoring systems, nodes, notebook computers, personal computers, portable electronic devices, portals (internal or external), rovers, scanners, servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, deep learning, deepfake fabricators, drivers, data structures, emails, extraction functionality, file systems or distributed file systems, firmware, governance rules, graphical user interfaces (GUI, UI, UX), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web integrants, web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

Figure 1B:
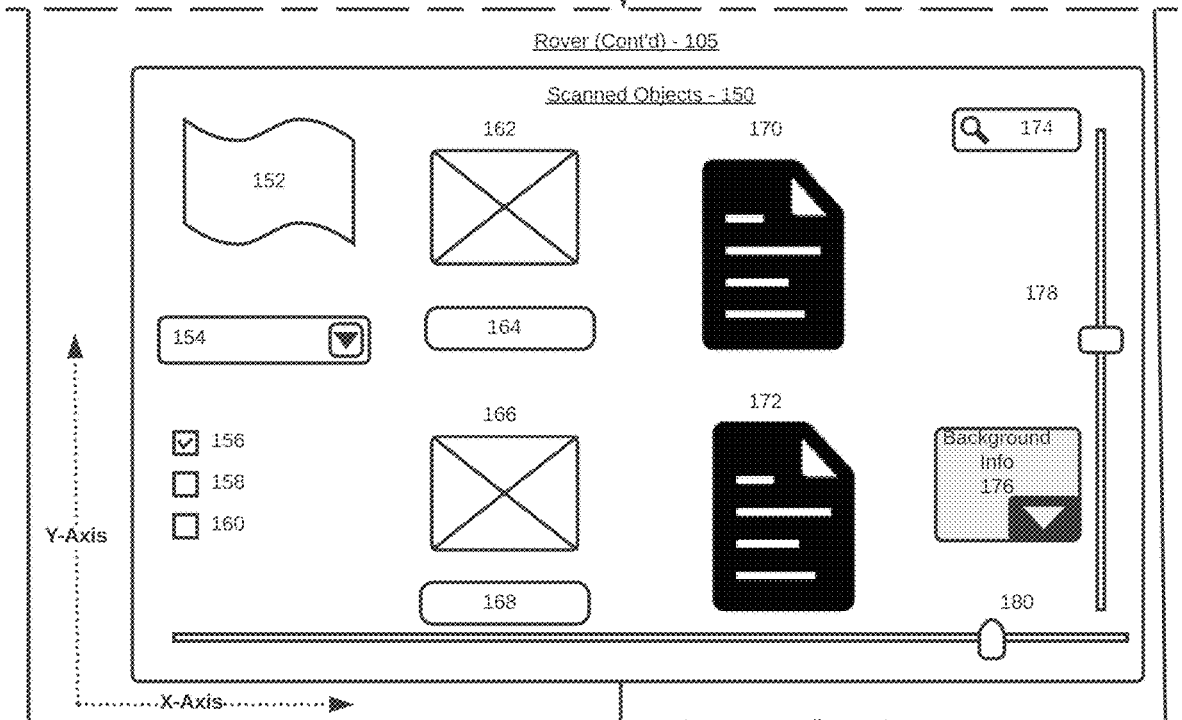

By way of non-limiting disclosure, FIGS. 1A and 1B depict sample structural diagrams in accordance with one or more deep-learning UI/UX standardization aspects of this disclosure in the context of creating UI/UX compliant websites by interface conversions based on an initial process of detection of objects and data.

In 100, a source document, webpage, image, file, photoshop file, or other input type can be ingested. As a non-limiting example, Photoshop documents (PSD) work well because they have a clearly defined file format 101 that includes: a header, a color mode data block, an image resources data block, a layer and mask information block, and image data. Some of this information is described below to demonstrate the types of information that can be captured from and provided by PSD files as opposed to other image files.

The header can be 26 bytes in length and can be structured as follows:

```
typedefstruct_PSD_HEADER
{
    BYTE Signature[4]; /*File ID "8BPS"*/
    WORD Version; /*Version number, always 1*/
    BYTE Reserved[6]; /*Reserved, must be zeroed*/
    WORD Channels; /*Number of color channels (1-24)
        including alpha channels*/
    LONG Rows; /*Height of image in pixels (1-30000)*/
    LONG Columns; /*Width of image in pixels (1-30000)
        */
    WORD Depth; /*Number of bits per channel (1, 8, and
        16)*/
    WORD Mode; /*Color mode*/
} PSD_HEADER;
```

Data in the mode field specifies how the image is to be interpreted (e.g., 0=Bitmap (monochrome), 1=Grayscale, 2=Indexed color (palette color), 3=RGB color, 4=CMYK color, 7=Multichannel color, 8=Duotone (halftone), and 9=Lab color).

Following the header is the color mode data block. At the start of this block is a number specifying the length of the block in bytes. The nature of the following data is related to the value of the mode field of the header. If the mode field value is 2, however, signifying indexed color, the following 768 bytes will contain a 256-color palette. If the mode field value is 6, signifying duotone data, the data following consists of screen parameters and other related information.

Following the color mode data block is the image resources block. Like the color mode data block, the first four bytes specify the length of the block. The following data consists of non-pixel data associated with an image and the format of the data is determined by the value in the ID field (e.g., channels, rows, columns, depth, mode; indexed color table; resolution information; alpha channel names; fixed-point border width, border units; background color; print flags; grayscale and halftoning information; color halftoning information; duotone halftoning information, duotone transfer functions; duotone image information; working path; layers group info; image mode for raw-format files; JPEG quality, etc.).

```
struct_ColorModeDataBlock
{
    BYTE Type[4]; /*Always "8BIM"*/
    WORD ID; /*( )*/
    BYTE Name[ ]; /*Even-length Pascal-format string, 2
        bytes or longer*/
    LONG Size; /*Length of resource data following, in
        bytes*/
    BYTE Data[ ]; /*Resource data, padded to even
        length*/
};
```

Resolution and display information is included too:

```
typedef struct_ResolutionInfo
{
    LONG hRes; /*Fixed-point number: pixels per inch*/
    WORD hResUnit; /*1=pixels per inch, 2=pixels per
        centimeter*/
    WORD WidthUnit; /*1=in, 2=cm, 3=pt, 4=picas,
        5=columns*/
    LONG vRes; /*Fixed-point number: pixels per inch*/
    WORD vResUnit; /*1=pixels per inch, 2=pixels per
        centimeter*/
    WORD HeightUnit; /*1=in, 2=cm, 3=pt, 4=picas,
        5=columns*/
} RESOLUTIONINFO;
typedef_DisplayInfo
{
    WORD ColorSpace;
    WORD Color[4];
    WORD Opacity; /*0-100*/
    BYTE Kind; /*0=selected, 1=protected*/
    BYTE Padding; /*Always zero*/
} DISPLAYINFO;
```

Following the image resources block is the layer and mask information block, structured like the color mode data and image resources blocks. This includes variables to set the rectangular bounding for the layer (e.g., top, left, bottom, right, and channels for the number of channels in the layer). Other detailed layer information can be contained in data structures in this block as well.

After the layer and mask information, the image data is provided and is stored as indicated in the header and the compression value preceding it.

If the source file is not in PSD format, it can be converted to PSD in 102. This is important because images are analyzed by one or more deep learning algorithms. After conversion in 102 or if the file is already in PSD format, the image can be loaded into the rover component in 104.

The rover engine 105 is a scanning and analysis tool. PSD information can be extracted and the image data can be scanned to detect objects and image characteristics in 106.

As an example, a webpage, window, or other image 108 may comprise various objects that can be detected by the scan in 106. Sample objects may include: company logo 110, drop-down menu 112, check boxes 114, picture 116, print button 118 to print picture 116, picture 120, print button 122 to print picture 120, metadata or picture information 124 and 126, a search field 128, a horizontal slider 132, and a vertical slider 134.

A graphical representation of the objects identified during scan 106 is shown in the scanned objects 150 at the top of FIG. 1B. This includes objects 152, 154, 156, 158, 160, 162, 164, 168, 170, 172, 174, 176, 178, and 180. Note, background information for the image can be considered as an object itself and is shown as 176.

Figure 2:
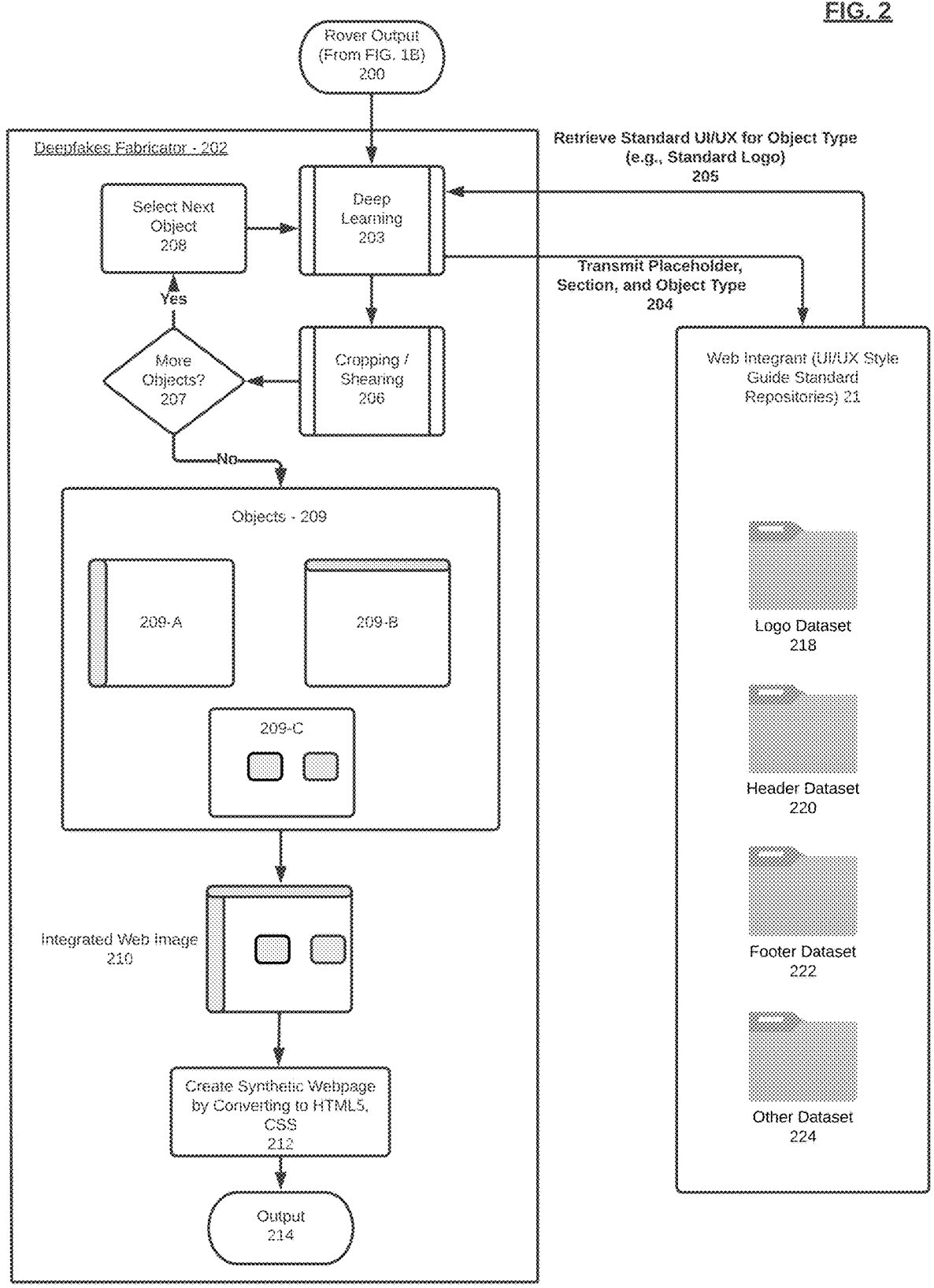
FIG. 2 depicts a sample structural in accordance with one or more deep-learning UI/UX standardization aspects of this disclosure in the context of creating UI/UX compliant websites by interface conversions based on a subsequent process of UI/UX standardization of detected objects and data that correspond to pre-defined datasets.

As illustrated in the compartmentalization table at the bottom of FIG. 1B, each object will have (X,Y) coordinates for placeholders 182 and sections/regions 184. This is illustrated in the compartmentalization engine 182. The type of object 186 that was identified is captured as well. The output 200 of the compartmentalization process is next provided to the deepfakes fabricator 202 as shown in FIG. 2.

More specifically, the rover output 200 is provided to a deep learning engine 203. This will transmit 204 the placeholder, section, and object type information to the web integrant 216 and will retrieve the standard UI/UX for the object type (e.g., a standard company logo) in 205. The web integrant component can store any number of datasets that are relevant to the UI/UX style guide such as: logo datasets 218, header datasets 220, footer datasets 222, and any other datasets 224.

Commercially available deep learning applications can be used to implement deep learning engine 203. This includes the deep learning applications from MathWorks, which provides MATLAB for deep learning. This enables data preparation, design, simulation, and deployment for deep neural networks. With a limited number of lines of MATLAB code, a skilled artisan can implement deep learning 203 and allow preparing and labeling of data (if desired for enhanced capability); generating web code and deploying a synthetic web site; using computer vision to acquire, process, and analyze images; implement deep reinforcement learning and define, train; and deploy reinforcement learning policies. The MatLab product family specifically includes a deep learning toolbox for artificial intelligence, data science, and statistics, as well as various code generation tools, application deployment utilities, and a verification, validation, and test toolbox system.

One or more deep-learning algorithms can be utilized such as, for example, Convolutional Neural Networks (CNNs), Long Short Term Memory Networks (LSTMs), Recurrent Neural Networks (RNNs), Generative Adversarial Networks (GANs), Radial Basis Function Networks (RBFNs), Multilayer Perceptrons (MLPs), Self Organizing Maps (SOMs), Deep Belief Networks (DBNs), Restricted Boltzmann Machines (RBMs), and Autoencoders.

As objects are identified by or passed to deep learning engine 203, the object info is passed 204 to the web integrant 216 and standardized UI/UX dataset information is retrieved 204 from the appropriate dataset folder 218, 220, 222, 224, etc. The deepfakes fabricator 202 will then perform cropping/shearing 206 in order to size the object appropriately for the proposed synesthetic webpage. If more objects are to be processed in 207, the next object can be selected in 208 and the process can continue in 203. This can repeat until all objects are identified as in 209. Discrete identified objects are depicted in 209 such as a vertical bar on the left side of an object 209-A, a top menu bar in object 209-B, and two objects in the center 209-C of the structure. The discrete objects of 209 can then be assembled in 210 into an integrated web image.

In 212, the integrated web image can be converted to a synthetic webpage by converting the image to HTML5, a cascading style sheet (CSS), etc. Commercially available image-to-webpage converters are available and any suitable one can be used to implement 212. Once converted, the synthetic webpage can be output in 214.

Figure 3:
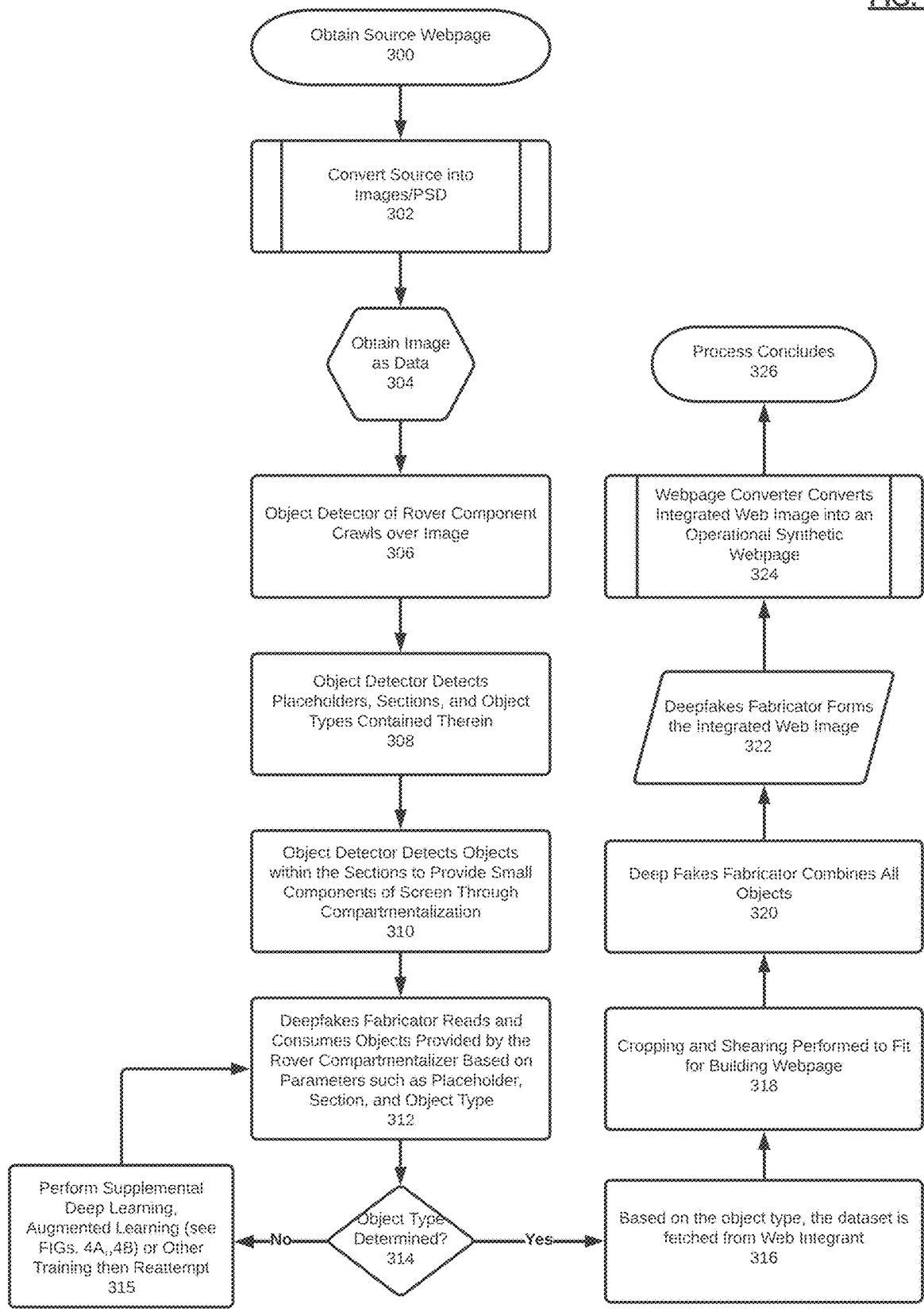
FIG. 3 depicts a functional flow diagram showing an exemplary process of creating synthetic websites by using deep-learning object detection and classification with subsequent UI/UX standardization based on pre-defined datasets in accordance with one or more compliance fabric aspects of this disclosure.

By way of non-limiting disclosure, FIG. 3 depicts a functional flow diagram showing an exemplary process of creating synthetic websites by using deep-learning object detection and classification with subsequent UI/UX standardization based on pre-defined datasets in accordance with one or more compliance fabric aspects of this disclosure.

A source webpage is obtained in 300. The source is converted into an image or a PSD file in 302. This results in an image being formed from the underlying data and/or metadata in 304 if desired or available. An object detector in the rover component next crawls over the image in 306. The object detector detects objects in 308 including their placeholders, sections/regions, and object types. The object detector detects objects within the sections to provide small components of the screen through compartmentalization in 310.

The deepfakes fabricator reads and consumes objects provided by the rover compartmentalizer based on parameters such as placeholder, section, and object time in 312. If the object type is not able to be determined in 314, supplemental deep learning, augmented learning (e.g., as in FIGS. 4A and 4B), manual intervention, or other training can be employed on the particular object in 315, and then the process can proceed again with 312.

If the object type is detected correctly, then the dataset corresponding to that particular object type can be fetched from a datastore in the web integrant in 316. Cropping and shearing can be performed to fit the standardized UI/UX object into the proposed synthetic webpage in 318. The deepfakes fabricator can then combine all of the objections in 320 and then form an integrated web image in 322. A commercially available webpage converter can then convert the integrated web image into an operational synthetic web page in 324 and the process can conclude. Additional testing or tweaking of the output can then be performed.

By way of non-limiting disclosure, FIGS. 4A and 4B illustrate samples of HTML or metadata that can be associated with a webpage or image that optionally can be used to augment deep-learning detection and classification of objects in accordance with one or more compliance fabric aspects of this disclosure.

In addition to simply using deep learning on images to generate the list of objects and their parameters, HTML code or metadata 400 may also be leveraged to increase the reliability of the detected object. As shown in FIG. 4A, this can include style sheet data 402 as well as font types, colors, sizes, margins, and padding information in 404.

The same is true with respect to the code shown in FIG. 4B. Style sheet data 402 can be identified. Scrollbar element data 406 can be captured. Scrollbar button data 408 can be identified. Scrollbar corner data 410 and scrollbar thumb element information can be extracted as well. This can result in an image illustrating the margin, border, padding, and interior data content as in 414.

Figure 5:
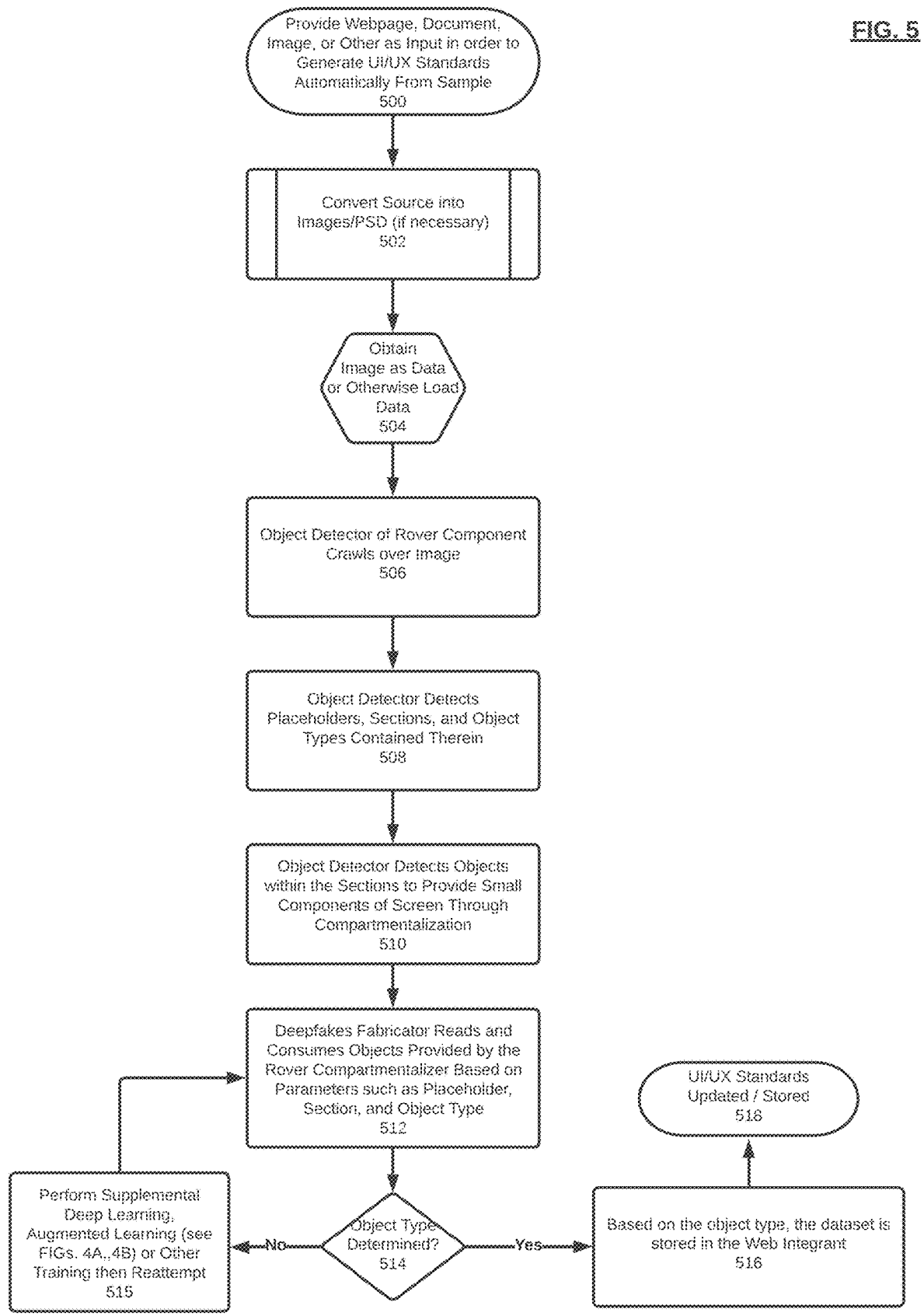
FIG. 5 depicts a functional flow diagram showing an exemplary process of using a document, webpage, image, or other as an input so that deep-learning object detection and classification can be used to automatically (partially or wholly) generate UI/UX standards based on the input in accordance with one or more compliance fabric aspects of this disclosure.

By way of non-limiting reference, FIG. 5 depicts an optional functional flow diagram showing an exemplary process of using a document, webpage, image, or other as an input so that deep-learning object detection and classification can be used to automatically (partially or wholly) generate UI/UX standards based on the input in accordance with one or more compliance fabric aspects of this disclosure. Stated differently, instead of manually preparing UI/UX standards, aspects of this disclosure can use deep learning to generate the standards automatically (in whole or in part).

An input is provided in 500 to function as a source for the UI/UX standards to be adopted. The source can be converted into an image or a PSD file in 502, which results in an image being formed from the underlying data and/or metadata in 504 if desired or available. Alternatively, data can be extracted from source code or structured data in the input document if not an image or PSD file. An object detector in the rover component can crawl over an image in 506. The object detector detects objects in 508 including their placeholders, sections/regions, and object types. The object detector detects objects within the sections to provide small components of the screen through compartmentalization in 510.

The deepfakes fabricator reads and consumes objects provided by the rover compartmentalizer based on parameters such as placeholder, section, and object time in 512. If the object type is not able to be determined in 514, supplemental deep learning, augmented learning (e.g., as in FIGS. 4A and 4B), manual intervention, or other training can be employed on the particular object in 515, and then the process can proceed again with 512.

If the object type is detected correctly, then the dataset corresponding to that particular object type can be identified and the UI/UX standard for that object or dataset can be stored in the web integrant in 518. Reports can be generated and a complete UI/UX style guide can be automatically prepared (in whole or in part) for future company or designer use.

Figure 6:
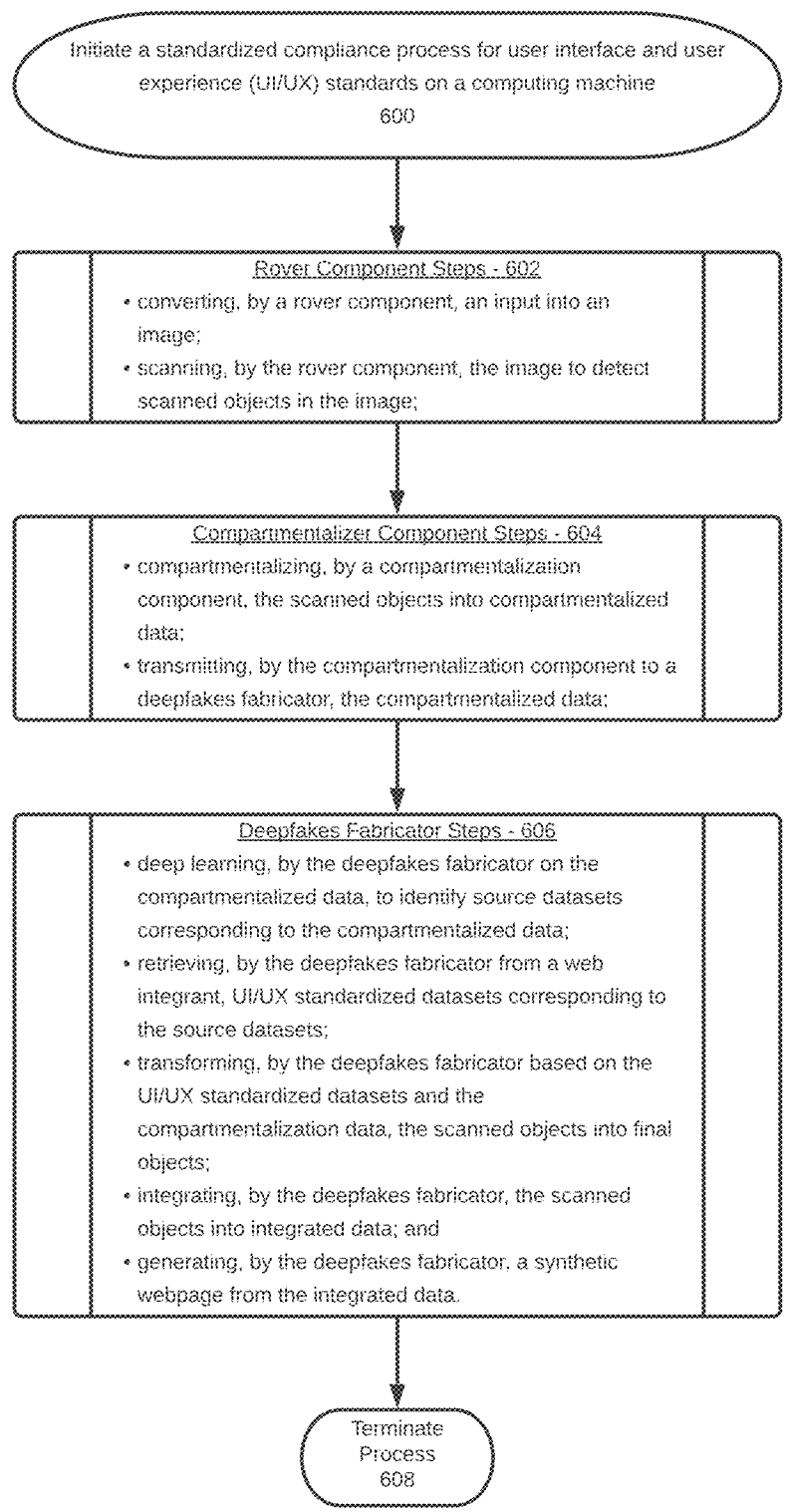
FIGS. 6 and 7 show sample standardized compliance processes for user interface and user experience (UI/UX) standards on a computing machine in accordance with one or more compliance fabric aspects of this disclosure.

By way of non-limiting reference, FIG. 6 shows a sample standardized compliance process for user interface and user experience (UI/UX) standards on a computing machine in accordance with one or more compliance fabric aspects of this disclosure.

In 600, a standardized compliance process for user interface and user experience (UI/UX) standards on a computing machine is initiated. In 602, a rover component performs steps such as: converting, by a rover component, an input into an image; and scanning, by the rover component, the image to detect scanned objects in the image.

In 604, a compartmentalizer component performs steps such as: compartmentalizing, by a compartmentalization component, the scanned objects into compartmentalized data; and transmitting, by the compartmentalization component to a deepfakes fabricator, the compartmentalized data.

In 606, a deepfakes fabricator performs steps such as: deep learning, by the deepfakes fabricator on the compartmentalized data, to identify source datasets corresponding to the compartmentalized data; retrieving, by the deepfakes fabricator from a web integrant, UI/UX standardized datasets corresponding to the source datasets; transforming, by the deepfakes fabricator based on the UI/UX standardized datasets and the compartmentalization data, the scanned objects into final objects; integrating, by the deepfakes fabricator, the scanned objects into integrated data; and generating, by the deepfakes fabricator, a synthetic webpage from the integrated data. The process then terminates in 608.

Figure 7:
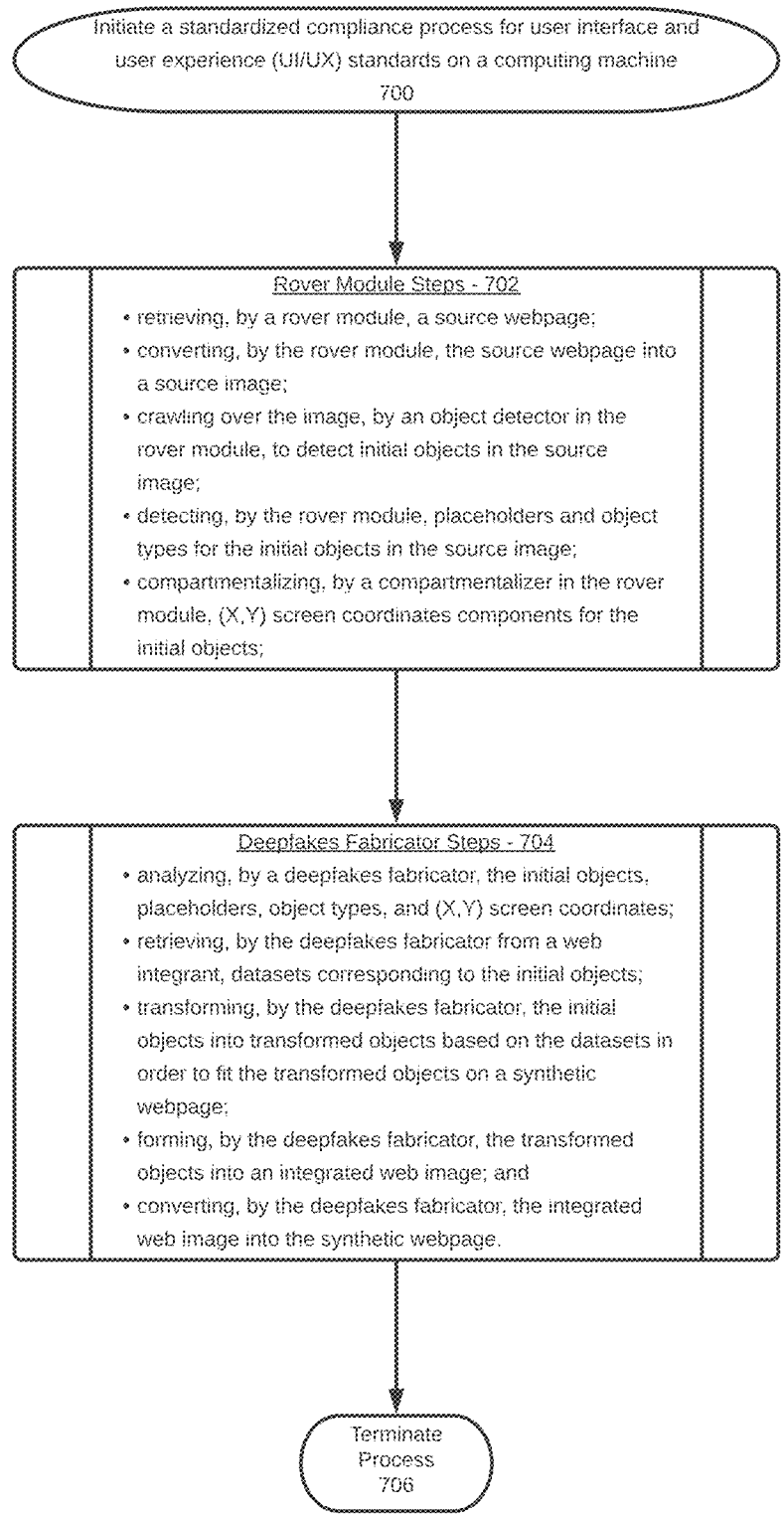

By way of non-limiting reference, FIG. 7 shows a sample standardized compliance process for user interface and user experience (UI/UX) standards on a computing machine in accordance with one or more compliance fabric aspects of this disclosure.

In 700, a standardized compliance process for user interface and user experience (UI/UX) standards on a computing machine is initiated. In 702, a rover module performs steps such as: retrieving, by a rover module, a source webpage; converting, by the rover module, the source webpage into a source image; crawling over the image, by an object detector in the rover module, to detect initial objects in the source image; detecting, by the rover module, placeholders and object types for the initial objects in the source image; and compartmentalizing, by a compartmentalizer in the rover module, (X,Y) screen coordinates components for the initial objects.

In 704, a deepfakes fabricator performs steps such as: analyzing, by a deepfakes fabricator, the initial objects, placeholders, object types, and (X,Y) screen coordinates; retrieving, by the deepfakes fabricator from a web integrant, datasets corresponding to the initial objects; transforming, by the deepfakes fabricator, the initial objects into transformed objects based on the datasets in order to fit the transformed objects on a synthetic webpage; forming, by the deepfakes fabricator, the transformed objects into an integrated web image; and converting, by the deepfakes fabricator, the integrated web image into the synthetic webpage. The process then terminates in 706.

Figure 8:
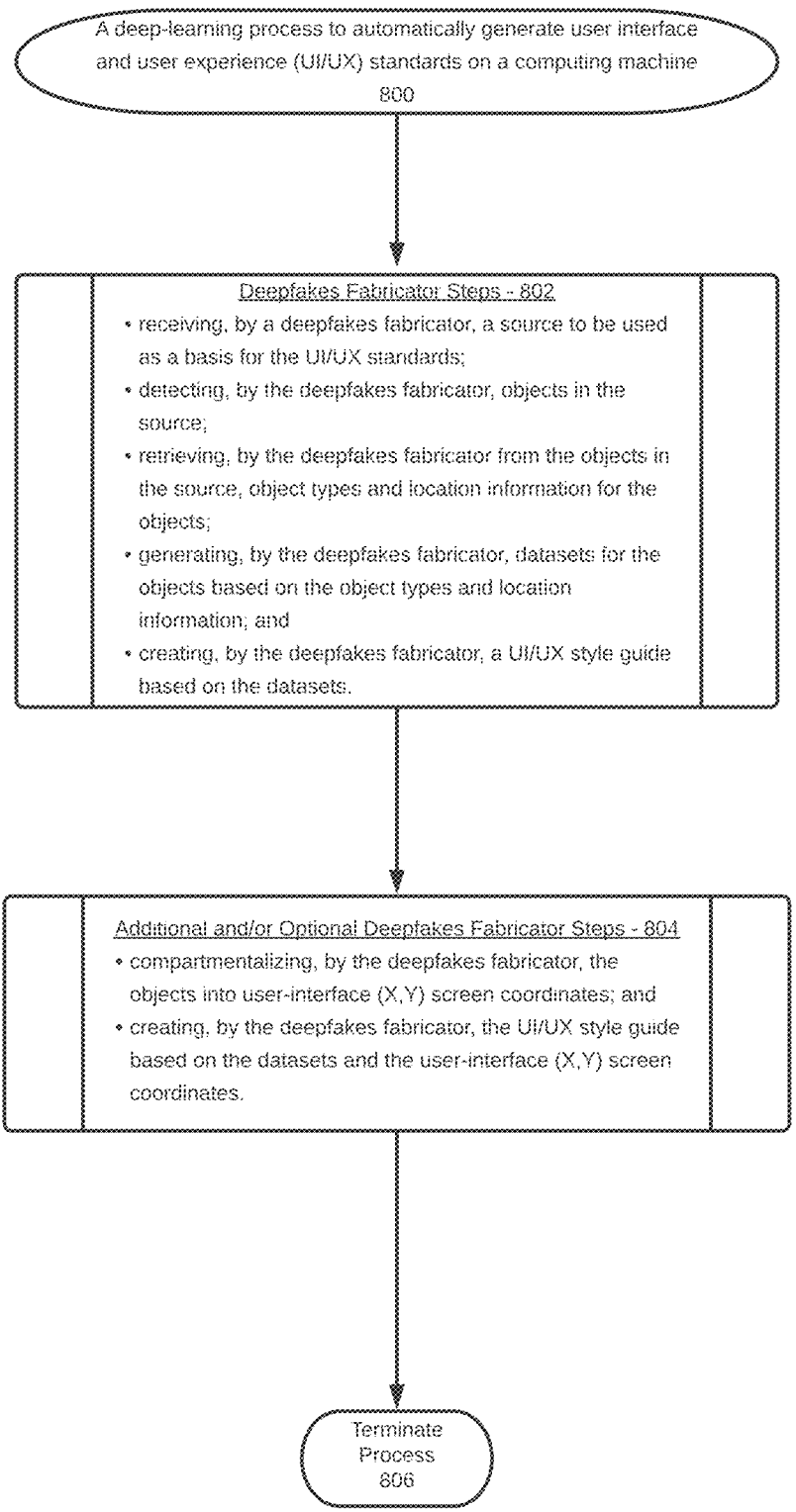
FIG. 8 shows a sample deep-learning process to automatically generate user interface and user experience (UI/UX) standards on a computing machine in accordance with one or more compliance fabric aspects of this disclosure.

By way of non-limiting reference, FIG. 8 shows a sample deep-learning process to automatically generate user interface and user experience (UI/UX) standards on a computing machine in accordance with one or more compliance fabric aspects of this disclosure.

In 800, a deep-learning process to automatically generate user interface and user experience (UI/UX) standards on a computing machine commences.

In 802, a deepfakes fabricator performs steps such as: receiving, by a deepfakes fabricator, a source to be used as a basis for the UI/UX standards; detecting, by the deepfakes fabricator, objects in the source; retrieving, by the deepfakes fabricator from the objects in the source, object types and location information for the objects; generating, by the deepfakes fabricator, datasets for the objects based on the object types and location information; and creating, by the deepfakes fabricator, a UI/UX style guide based on the datasets.

In 804, additional and/or optional steps may be performed such as: compartmentalizing, by the deepfakes fabricator, the objects into user-interface (X,Y) screen coordinates; and creating, by the deepfakes fabricator, the UI/UX style guide based on the datasets and the user-interface (X,Y) screen coordinates. Afterwards, the process terminates in 806.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A deepfakes process to automatically create user-interface/user-experience (UI/UX) design standards and automatically utilize the UI/UX design standards to generate conforming websites, the deepfakes process comprising the steps of:
generating user-interface/user-experience (UI/UX) standards from a design image by:
receiving, by a deepfakes fabricator, a base design to be used as a basis for the UI/UX standards;
analyzing, by the deepfakes fabricator with deep learning, the design image in order to detect and perform classification of sample objects, sample text, sample placeholders, and sample sections;

compartmentalizing, by the deepfakes fabricator, the sample objects, the sample text, the sample placeholders, and the sample sections into sample (X, Y) screen coordinates;

generating, by the deepfakes fabricator using the deep learning, style datasets from the sample objects, the sample text, the sample placeholders, the sample sections, and the sample (X, Y) screen coordinates, said style datasets including at least: object types, object locations, object layouts, text typography, text sizes, text colors, and text locations;

creating, by the deepfakes fabricator, the UI/UX standards from the style datasets;

storing, by the deepfakes fabricator, the UI/UX standards as a UI/UX web integrant;

creating, from a source webpage, a synthetic webpage that complies with the UI/UX standards by:

receiving, by the deepfakes fabricator, the source webpage;

converting, by the deepfakes fabricator, the source webpage into a webpage image;

analyzing, by the deepfakes fabricator with the deep learning, the webpage image in order to detect and perform classification of source objects, source text, source placeholders, and source sections;

compartmentalizing, by the deepfakes fabricator, the source objects, the source text, the source placeholders, and the source sections into source (X, Y) screen coordinates;

loading, by the deepfakes fabricator, the UI/UX web integrant;

transforming, by the deepfakes fabricator based on the UI/UX web integrant, the source objects, the source text, the source placeholders, and the source sections into compliant objects, compliant text, compliant placeholders, and compliant sections that complies with the UI/UX standards;

generating, by the deepfakes fabricator, the synthetic webpage from the source webpage that utilizes the compliant objects, the compliant text, the compliant the placeholders, and the compliant sections instead of the source objects, the source text, the source placeholders, and the source sections; and deploying the synthetic webpage, whereby the synthetic webpage complies with the UI/UX standards.

\* \* \* \* \*